Figure 1:
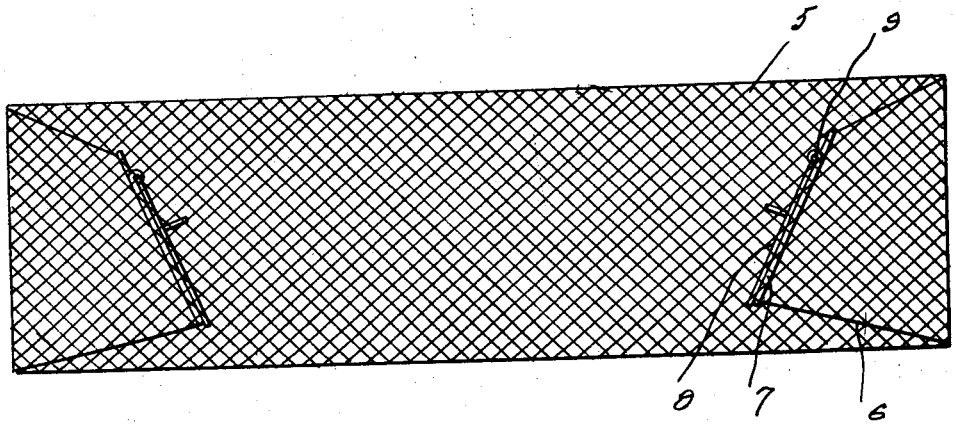

July 28, 1931.  C. L. TOPP  1,816,269
MUSKRAT TRAP
Filed April 25, 1930  2 Sheets-Sheet 1

Inventor
Chas. L. Topp
By Clarence A. O'Brien
Attorney

July 28, 1931.  C. L. TOPP  1,816,269
MUSKRAT TRAP
Filed April 25, 1930  2 Sheets-Sheet 2

Inventor
Chas. L. Topp

By Clarence A. O'Brien
Attorney

Patented July 28, 1931

1,816,269

UNITED STATES PATENT OFFICE

CHARLES L. TOPP, OF CENTER TOWNSHIP, ROCK COUNTY, WISCONSIN

MUSKRAT TRAP

Application filed April 25, 1930. Serial No. 447,285.

The present invention relates to a trap particularly designed for the purpose of catching muskrats and the object of the invention is the provision of a trap of this nature which is exceedingly simple in its construction, inexpensive to manufacture, strong and durable, and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

Figure 4:
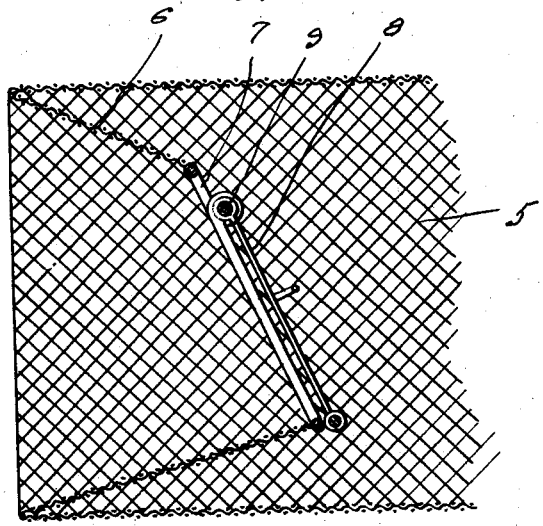
Figure 2:
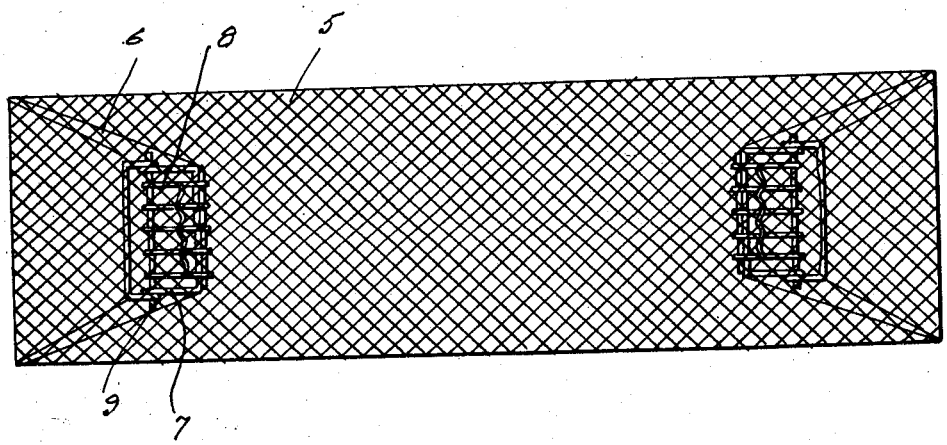
Figure 3:
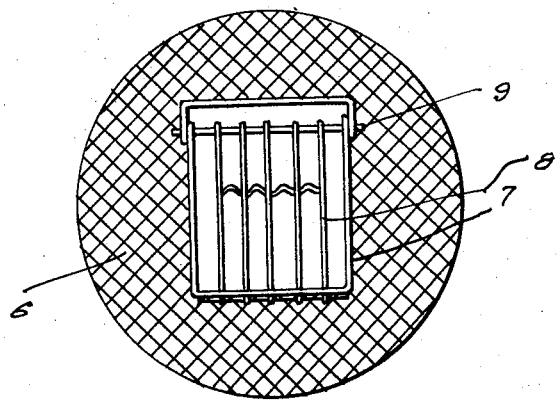

In the drawings:

Figure 1 is a side elevation of the trap embodying the features of my invention, Figure 2 is a top plan view thereof, Figure 3 is an end elevation thereof, and Figure 4 is a fragmentary longitudinal section taken substantially on the line 4—4 of Figure 2.

Referring to the drawings in detail it will be seen that a cylindrical wire mesh cage 5 is formed with inwardly directed and inwardly tapered funnel shaped end portions 6 on the inner ends of which are rectangular frames 7 in which are hingedly mounted doors 8. These doors 8 are swingable on pins 9 across the upper portion of the frames 7 and are adapted to abut the inner bottom portions of the frame so that the doors are capable of swinging inwardly and upwardly from closed positions but cannot swing outwardly from closed positions.

It will also be noted the frames 8 are inclined downwardly and inwardly. The trap is to be laid in the water in the runway of the muskrat. The muskrat will swim or run into the funnel end portion 6 and when it comes to the door which opens inwardly and upwardly, the muskrat will push against the door as it would push against weeds in the water. When the muskrat pushes against the door it will cause it to open and that will admit the muskrat to the inside of the trap and the door will then swing back and downwardly and be closed. If the entire trap is placed below the surface of the water the muskrat will enter the trap and drown. If it is desired to keep the muskrat alive, a portion of the trap may be left above the surface of the water.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A trap of the type described comprising a reticulated cylinder having an inwardly directed funnel formation in each end, a door frame of rectangular form provided with integral laterally formed loops near the upper ends of the sides of the frame, a shaft carried across the frame in said loops, and a door supported on said shaft, said door consisting of a plurality of vertical transversely spaced bars, and a waved cross bar securing and spacing said bars with respect to each other, the upper ends of the bars terminating below the top of the frame and the lower ends of the bars positioned to abut the inside of the bottom member of the frame when the door is in closed position.

In testimony whereof I affix my signature.

CHARLES L. TOPP.